(12) United States Patent
Retali

(10) Patent No.: US 12,328,576 B2
(45) Date of Patent: Jun. 10, 2025

(54) METHOD OF SECURING RADIO COMMUNICATION BETWEEN AN AIRCRAFT AND A RAMP AGENT

(71) Applicant: GLOBALSYS, Bonneuil sur Marne (FR)

(72) Inventor: Dominique Retali, Champigny-sur-Marne (FR)

(73) Assignee: GLOBALSYS, Bonneuil sur Marne (FR)

( * ) Notice: Subject to any disclaimer, the term of this patent is extended or adjusted under 35 U.S.C. 154(b) by 344 days.

(21) Appl. No.: 18/098,389

(22) Filed: Jan. 18, 2023

(65) Prior Publication Data

US 2023/0232225 A1 Jul. 20, 2023

(30) Foreign Application Priority Data

Jan. 18, 2022 (FR) ..................................... 2200425

(51) Int. Cl.
*H04W 12/06* (2021.01)
*H04W 76/10* (2018.01)

(52) U.S. Cl.
CPC ......... *H04W 12/068* (2021.01); *H04W 76/10* (2018.02)

(58) Field of Classification Search
CPC ... H04W 12/068; H04W 12/08; H04W 76/10; H04L 63/0861; A23B 40/00; H10D 30/0327; H10D 64/311; H10F 77/1692
See application file for complete search history.

(56) References Cited

U.S. PATENT DOCUMENTS

| 9,919,712 | B1 * | 3/2018 | Doyen | A61B 5/14542 |
| 10,387,808 | B1 * | 8/2019 | Scott | G06Q 50/06 |
| 2018/0251219 | A1 * | 9/2018 | Taylor | G06V 20/13 |

FOREIGN PATENT DOCUMENTS

| EP | 1280316 A2 | 1/2003 |
| FR | 2829324 A1 | 3/2003 |

* cited by examiner

*Primary Examiner* — Azizul Choudhury
(74) *Attorney, Agent, or Firm* — MUNCY, GEISSLER, OLDS & LOWE, P.C.

(57) ABSTRACT

A method of securing radio communication between a ramp agent and an aircraft provided with a base station adapted to transmit a beacon signal includes establishing a first database identifying organizations such as aircraft operators and authorized service providers; for each organization, establishing a second database identifying the ramp agents that it employs and associating biometric data with each ramp agent; providing the ramp agent with a terminal; and when attempting to establish communication between the ramp agent and the aircraft, performing two checks relating firstly to the identity of the ramp agent and secondly to the ramp agent's employer organization in order to verify whether the agent is indeed authorized to establish such communication.

7 Claims, 3 Drawing Sheets

Fig. 2

| Airlines [A] | Airport Assistance Companies [B] | Maintenance Companies [C] | Oil Companies [D] |
|---|---|---|---|
| 1 Air France | 1 Swissport | 1 SABENA Tecnics | 1 TOTAL |
| 2 Lufthansa | 2 Aviapartner | 2 SR Technics | 2 ESSO |
| 3 British Airways | 3 DNATA | 3 HAECO | 3 BP |
| 4 SWISS | 4 Menzies | ... | ... |
| 5 KLM | ... | ... | ... |

| Group | Organization | Organization Identifier |
|---|---|---|
| A | 1 | IDA1 |
| A | 2 | IDA2 |
| ⋮ | ⋮ | ⋮ |
| B | 1 | IDB1 |
| ⋮ | ⋮ | ⋮ |

Fig. 4

Authorization granted by IDA1

| A | B | C | D |
|---|---|---|---|
| 1 | 2 | 3 | 1 |
| 5 | | | |
| ⋮ | ⋮ | ⋮ | ⋮ |

Fig. 5

| Agent | Organization | Identifier |
|---|---|---|
| Michel Durand | IDA1 | IDAG1 |
| Paul Dupont | IDA1 | IDAG2 |
| ⋮ | ⋮ | ⋮ |

B2

METHOD OF SECURING RADIO COMMUNICATION BETWEEN AN AIRCRAFT AND A RAMP AGENT

BACKGROUND OF THE INVENTION

There exists a need to establish communication between the pilots of an aircraft and ground crew during operations of arriving at or departing from an airport. Such communication serves to coordinate the activities of the pilots and of the ground crew (loading or unloading baggage, moving the aircraft by means of a tractor, . . . ). Conventionally, a ramp agent seeking to establish communication with the aircraft is equipped with a headset and connects its cord directly to a connector carried by a box arranged on the aircraft landing gear. To make it easier to establish such communication, proposals have been made to establish radio communication between the ramp agent and the aircraft. To this end, proposals have been made to provide the aircraft with a dedicated antenna enabling communication on open frequencies for short range, for example of Wi-Fi, DECT, . . . type. However, a connection between a ramp agent's mobile terminal (such as a tablet or a mobile telephone) and an aircraft needs to be established under special safety conditions in order to prevent communication of this type being established by unauthorized people.

Document FR2829324 discloses a method of establishing radio communication between at least one site-resident subscriber such as a ramp agent and having a mobile station (e.g. a terminal such as a tablet or a telephone, . . . ) and at least one roaming subscriber installed in a vehicle (such as an aircraft) equipped with a base station suitable for transmitting a beacon signal identifying the base station, each mobile station being adapted to sense a plurality of beacon signals transmitted by different base stations, the method comprising the steps of a mobile station selecting a base station and establishing communication between the mobile station and the selected base station. That arrangement enables the aircraft to be recognized remotely by the ramp agent's wireless communication terminal of the ramp agent.

It needs to be verified that a person attempting to make a connection with an aircraft by means of a terminal is indeed authorized to do so. In this respect, it is known that ramp agents are employed by various different organizations, such as aircraft operators themselves (in particular airlines) or service companies (airport staff, service providers involved in loading/unloading baggage, supplying the aircraft with fuel, meal trays, etc.).

OBJECT OF THE INVENTION

An object of the invention is to provide a method of securing radio communication between an aircraft and ramp agents attempting to connect to the aircraft.

SUMMARY OF THE INVENTION

In order to achieve this object, there is provided a method of securing radio communication between a ramp agent and an aircraft provided with a base station adapted to transmit a beacon signal, the method comprising the steps of:

establishing a first database identifying organizations such as aircraft operators and service providers that employ ramp agents who might establish radio communication with an aircraft of at least one of the aircraft operators, and, for each aircraft operator, identifying other aircraft operators and service providers that it authorizes to enable their ramp agents to establish radio communication with any of its aircraft;

for each organization, establishing a second database identifying its employed ramp agents who are equipped to establish radio communication with aircraft, and associating biometric data with each ramp agent;

providing the ramp agent with a terminal including reader means for reading biometric data and adapted to enter into radio communication with the aircraft;

incorporating aircraft identification information in the aircraft beacon signal;

when attempting to establish communication between the ramp agent and an aircraft that the agent has selected after identifying it by using the beacon signal received by the terminal, performing a first check using the biometric data reader means to enable the terminal to identify the ramp agent who is using the terminal by comparison with biometric data extracted from the second database, and to deduce therefrom the agent's employer organization;

if the first check is positive, performing a second check making use of data extracted from the first database, to verify that the ramp agent's employer organization is the aircraft operator itself or one of the organizations it has authorized; and if the second check is positive, establishing a connection enabling radio communication between the ramp agent and the aircraft.

Thus, connection is established between the terminal and the base station only after performing two checks: a first check that is performed by the terminal and that identifies the agent who is using the terminal, and a second check that is performed either by the terminal or by the aircraft base station and that ensures that the ramp agent attempting to establish radio communication is indeed attached to the aircraft operator itself or to one of the organizations the aircraft operator has authorized to establish such communication with one of its aircraft.

The expression "data extracted from the first database" is used to mean that the base station (or more generally the aircraft) is capable either of connecting in real time (for example via a Wi-Fi or GSM network) to a server hosting the first database in order to interrogate it, or else hosts a copy of the database and interrogates that copy. Specifically, the aircraft may be far from any network and must be able to perform the verifications required for establishing radio communication with ramp agents even in the absence of a network.

The expression "data extracted from the second database" is used to mean that the terminal is capable either of connecting in real time to a server hosting the second database, or else hosts a copy of the database and interrogates that copy. For example, the data may be on a memory card attached to the terminal. Preferably, the copies of the databases are regularly updated. Preferably, the first database is established and enriched by a third-party organization independent of the aircraft operators and of the service providers, for example one of the regulatory or standardization agencies such as the FAA, the EASA, the ARINC, . . . . Aircraft operators and service providers would then register with the independent third-party organization in order to be included in the first database, and aircraft operators would identify the organizations they authorize to establish radio communication with their aircraft.

In a preferred implementation of the invention, in addition to the aircraft beacon signal including aircraft identification information, it also includes identification information of organizations authorized by the aircraft operator, which information is extracted from the first database.

It is then preferable for the second check to be performed by the terminal. Thus, both checks are performed by the terminal. It is then appropriate for the information extracted from the first database about authorized organizations to be available to the terminal in order to perform the second check. This information may be included directly in the beacon signal, or it may be sent in a message transmitted by the base station in response to a connection request transmitted by the terminal after the user has selected the aircraft with which to connect.

BRIEF DESCRIPTION OF THE DRAWING

The invention can be better understood on reading the following description of a particular implementation of the invention, given with reference to the figures of the accompanying drawings, in which:

FIG. 2 is a table extracted from a first database and identifying organizations whose ramp agents might establish radio communication with aircraft;

FIG. 3 is a table extracted from the first database listing the identifiers given to aircraft operators and to service providers;

FIG. 4 is a table extracted from the first database listing the authorizations given by one of the aircraft operators to allow service providers to establish radio communication with its aircraft; and FIG. 5 is a table extracted from a second database established by an organization and identifying the ramp agents it employs who might enter into radio communication with aircraft.

DETAILED DESCRIPTION OF THE INVENTION

Figure 1:
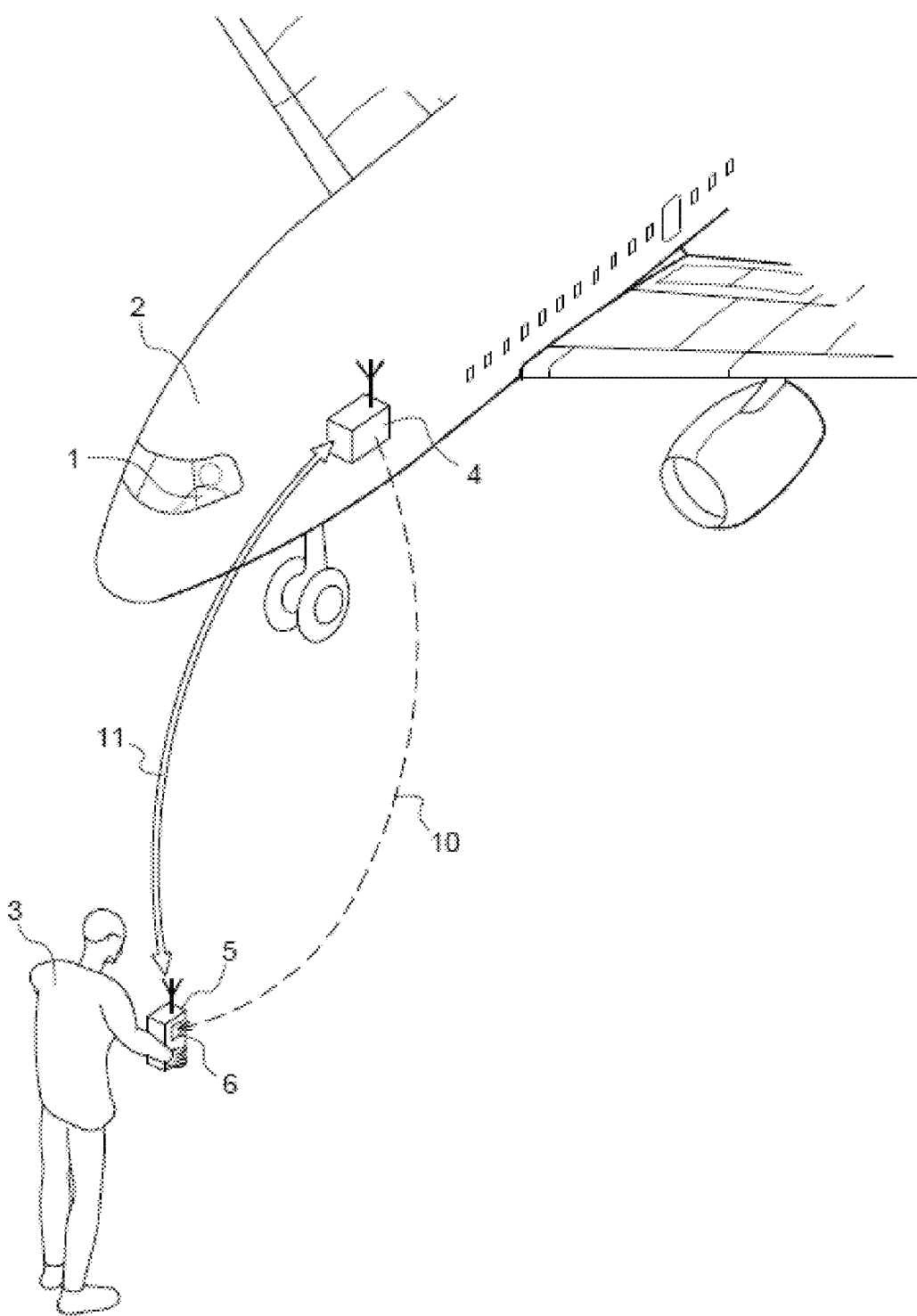
FIG. 1 is a perspective view of an aircraft while establishing radio communication with a ramp agent's terminal.

With reference to FIG. 1, the method of the invention is for establishing radio communication between members 1 of the crew of an aircraft 2 and site-resident subscribers, such as a ramp agent 3 of an airport site being visited by the aircraft.

In known manner, the aircraft 2 is equipped with a base station 4 associated with a radio communication system, while the ramp agents 3 have respective terminals 5 suitable for communicating with the base station 4.

In order to be able to establish communication with the ramp agents, and in known manner, the base station 4 makes itself known to them by transmitting a beacon signal 10 that includes both an identification reference of the corresponding base station and also an identification reference of the aircraft (such as its registration). Alternatively, it is possible to identify the aircraft from the identification reference of the base station, by consulting a database.

The arrival of the aircraft in range of the terminal 5 is detected by the terminal receiving the beacon signal 10 that is being transmitted by the base station 4, and as symbolized by a chain-dotted arrow in the figure. The ramp agent 3 can then identify those aircraft that are in range and can select the aircraft with which to communicate by radio. Radio communication 11 is then established as illustrated by the double-line arrow in the figure.

With reference to FIGS. 2 to 5, there follows a description of how radio communication is established in a particular implementation of the invention.

Beforehand, and as shown in FIGS. 2, 3, and 4, a first database B1 is established identifying organizations that might employ the ramp agent 3, such as aircraft operators and service providers employing ramp agents who are required to establish radio communication with the airline aircraft. The first database B1 is preferably established by a third-party organization that is independent of the aircraft operators and of the service providers. FIG. 2 gives a simplified example of the structure of the first database B1 comprising only four groups of organizations. The names of aircraft operators or service providers are given purely by way of illustration and do not engage those companies or limit the scope of the invention:

Group A: Aircraft Operators, including in this example 1: AIR France, 2: Lufthansa, 3: British Airways, 4: SWISS, 5: KLM, etc. . . . . .

Group B: Airport Assistance Companies, including in this example 1: Swissport, 2: Aviapartner, 3: DNATA, 4: Menzies, etc. . . . . .

Group C: Maintenance—Repair Companies, including in this example 1: SABENA Technics, 2: SR Technics, 3: HAECO, etc. . . . . .

Group D=Oil Companies, including in this example 1: TOTAL, 2: ESSO, 3: BP, etc. . . . . .

As shown in FIG. 3, the first database B1 allocates a respective organization identifier IDA1, IDA2, IDB1, . . . to each aircraft operator or service provider. As shown in FIG. 4, the first database B1 also gathers the authorizations that aircraft operators grant to certain other aircraft operators (e.g. sister airlines such as AIR France/KLM) and to certain service providers so that their agents can establish radio communication with its aircraft, these authorizations being listed in the form of a table. Thus in this example, AIR FRANCE has authorized its own ramp agents as well as those of the sister airline KLM, and also the ramp agents of the companies Aviapartner, HAECO, and TOTAL to enter into radio communication with its aircraft.

Thus, the first database B1 summarizes, for a given aircraft operator (AIR FRANCE in this example), the various organizations whose ramp agents are authorized to establish communication with its aircraft (each organization being designated by its code as established by the above steps).

In a preferred implementation of the invention, information identifying the aircraft operator and the organizations authorized by the aircraft operator is transmitted in the beacon signal 10. For example, it is possible for the beacon signal to include the organization identifiers IDA1, IDB1, . . . , of the aircraft operator and of the companies it authorizes, in the form of a coded message MC.

By way of example, if AIR FRANCE has authorized its own ramp agents, those of KLM, and those of the companies Aviapartner, HAECO, and TOTAL to enter into radio communication with its aircraft, then the MC coded message transmitted by the beacon signal will be: MC={A=1;5, B=2, C=3, D=1}.

If AIR France authorizes all oil companies to establish radio communication with its aircraft, then the coded message transmitted by the beacon signal would be MC={A=1; 5, B=2, C=3, D=0}, the 0 indicating that all companies in the group concerned are authorized.

Supposing that SWISS has authorized its own agents as well as the ramp agents of the companies Swissport, SR Technics, and ESSO, then the coded message transmitted by the beacon signal would be: MC={A=4, B=1, C=2, D=2}.

To form this coded message MC, the base station 4 extracts data from the first database B1. This extraction may take various forms. By way of example, a connection may be set up by putting the base stations of the aircraft into communication with an operating service of the airport giving it access in real time to the first database B1 hosted on a server of the independent organization. Alternatively, the base station 4 may host a copy of the first database B1, and more specifically of the portion thereof relating only to the authorizations granted by the aircraft operator. This copy is preferably updated regularly to take account of any changes in these authorizations.

As shown in FIG. 5, each aircraft operator or service provider has also previously established a second database B2 that includes a list of its ramp agents who might establishing radio communication with aircraft, together with the identifiers IDAG1, IDAG2, . . . , of those ramp agents and also with biometric data for identifying the ramp agents reliably. By way of example, there is shown a diagrammatic illustration of the database that might be formed by the airline whose identifier is IDA1 (the biometric data is not shown).

There follows a description of how the connection is made between the ramp agent 3 and the aircraft. When the aircraft 2 arrives at the airport, the base station 4, as activated for this purpose (for example by means of a contact on one of its undercarriages), delivers the beacon signal 10 containing not only the identification of the aircraft, but also information identifying the operator of the aircraft in question, and also the organizations authorized by that aircraft operator, e.g., specifically, the coded message MC giving connection authorizations.

The terminal 5 of the ramp agent 3 receives beacon signals from the various aircraft that are in range, and the ramp agent 3 then selects the aircraft 2 with which to establish radio communication.

According to the invention, before establishing such radio communication, a first check is performed by the terminal 5 whereby the ramp agent 3 is identified by the terminal 5. For this purpose, the agent uses a biometric reader 6 of the terminal 5, e.g. a fingerprint reader. The terminal 5 consults data extracted from the second database B2 in order to compare the fingerprint acquired by the biometric reader and the fingerprints contained in the database B2 and thus identify the ramp agent 3 reliably. This consultation may take various forms. By way of example, a connection may be established by the terminal 5 giving it access in real time to the second database B2 that is hosted on a server of its employer organization. Alternatively, the terminal may host its own copy of the second database B2. This copy is preferably updated regularly to take account of any changes in these authorizations. By way of example, this copy may be contained in a removable tamper-proof memory medium mounted on the terminal 5. It is possible to ensure that the identification performed in this way remains valid for a certain length of time (typically a few hours), in order to avoid consulting the database B2 too frequently.

Once the ramp agent has been identified, a second check is performed, specifically by the terminal 5, which identifies the ramp agent's employer organization by its organization identifier, and, by reading the information contained in the beacon signal 10 from the base station 4 of the aircraft 2, then verifies that the ramp agent's employer organization is indeed authorized by the aircraft operator to establish radio communication with its aircraft. To do this, it compares the organization identifier of the organization employing the ramp agent 3 with the list of authorized organization identifiers that the terminal has received in the beacon signal 10, or has deduced from the coded message MC contained in the beacon signal 10. If the organization identifier concerned is indeed on the list (either the aircraft operator itself or one of the authorized companies), then the terminal 5 is authorized to perform a connection procedure in order to establish radio communication with the aircraft, for example using a DECT, Bluetooth, Wi-Fi, . . . , protocol. The ramp agent 3 can then establish radio communication with the aircraft 2.

Thus, radio communication is established by performing two checks relating firstly to checking the identity of the ramp agent, and secondly to checking whether the aircraft operator has granted the ramp agent's employer organization to enter into radio communication with its aircraft. In this example, these checks are carried out by the ramp agent's terminal.

Once the connection is established, the ramp agent or equipment under the agent's control can send or receive data to or from the aircraft.

Naturally, the invention is not limited to the above-described embodiment and variants may be applied thereto without going beyond the ambit of the invention as defined by the claims.

In particular, provision may be made for the copy of the first database in the aircraft base station to be renewed at regular intervals, either when the aircraft accesses airport infrastructure enabling it to establish communication via the Internet with the independent third-party organization server that hosts the first database, or while the aircraft is visiting a maintenance center of the aircraft operator.

Likewise, the copy of the second database in the terminal is preferably renewed regularly, for example when the ramp agent returns the terminal 5 after it has been in use and places it in its battery charging receptacle.

Although above, the identification information about the organizations authorized by the aircraft operator is included in the beacon signal as transmitted by the base station and received by the terminal, it is also possible to deliver this information in a message transmitted by the base station in response to a connection request transmitted by the terminal after the user whose terminal has received the beacon signal has selected the aircraft with which to make a connection.

Although above, both checks are performed by the terminal 5, the second check could be performed by the base station of the aircraft. Under such circumstances, the identification information about the organizations authorized by the aircraft operator is not transmitted to the terminal, but is used by the base station to verify that the ramp agent's employer organization is indeed one of the authorized organizations. For this purpose, the terminal sends the identification code of its employer organization to the base station.

Although above, the biometric data relates to one or more fingerprints, the biometric data could relate (as an alternative or in addition) to one or more other kinds of data, e.g. such as data relating to the user's face, or to an eye (iris), . . . . The biometric reader may thus identify a user by fingerprint recognition and/or by facial recognition and/or by eye recognition, . . . .

Although above, the information exchanged between the aircraft and the user (e.g. identification information) is unencrypted, at least some of the information exchanged between the aircraft and the user could be encrypted. This makes it possible to make communication between the aircraft and the user even more secure. By way of example, encryption may use an encryption key (64 bits, 128 bits, . . . ) or may use any other method.

Furthermore, additional authentication (of the aircraft by the user and/or of the user by the aircraft) may be performed (for example by cryptography and in particular asymmetric cryptography and for example cryptography by public/private key exchange, etc., or by any other method). This makes it possible to make communication between the aircraft and the user even more secure.

The invention claimed is:

1. A method of securing radio communication between a ramp agent and an aircraft provided with a base station adapted to transmit a beacon signal, the method comprising the steps of: establishing a first database identifying organizations that employ ramp agents who might establish radio communication with an aircraft of at least one of the aircraft operators, and, for each aircraft operator, identifying the organizations that it authorizes to be able to have their ramp agents establish radio communication with any of its aircraft; for each organization, establishing a second database identifying its employed ramp agents and associating biometric data with each ramp agent; providing the ramp agent with a terminal including reader means for reading biometric data and adapted to enter into radio communication with the aircraft; incorporating aircraft identification information in the aircraft beacon signal; when attempting to establish communication between the ramp agent and an aircraft that the agent has selected after identifying it by using the beacon signal received by the terminal, performing a first check using the biometric data reader means to enable the terminal to identify the ramp agent who using the terminal by comparison with biometric data extracted from the second database, and to deduce therefrom the agent's employer organization; if the first check is positive, performing a second check, making use of information extracted from the first database, to verify that the ramp agent's employer organization is the aircraft operator itself or one of the organizations it has authorized; and if the second check is positive, establish a connection allowing radio communication between the ramp agent and the aircraft.

2. The method according to claim 1, wherein the second check is performed by the terminal using identification information for the aircraft operator and for the organizations that are authorized by the aircraft operator, which information is extracted from the first database and is sent by the aircraft to the terminal.

3. The method according to claim 2, wherein the identification information is included in the beacon signal.

4. The method according to claim 3, wherein the beacon signal contains a coded message containing the identification information.

5. The method according to claim 1, wherein the aircraft base station hosts a copy of the first database.

6. The method according to claim 1, wherein the terminal hosts a copy of the second database.

7. The method according to claim 1, wherein at least some of the information exchanged between the aircraft and the ramp agent is encrypted.

* * * * *